(12) United States Patent
McCullough

(10) Patent No.: US 9,686,391 B1
(45) Date of Patent: Jun. 20, 2017

(54) COLLAPSIBLE SHOULDER REST FOR PORTABLE ELECTRONIC DEVICE

(71) Applicant: Terry L. McCullough, Valencia, PA (US)

(72) Inventor: Terry L. McCullough, Valencia, PA (US)

( * ) Notice: Subject to any disclaimer, the term of this patent is extended or adjusted under 35 U.S.C. 154(b) by 0 days.

(21) Appl. No.: 15/263,980

(22) Filed: Sep. 13, 2016

Related U.S. Application Data

(60) Provisional application No. 62/218,604, filed on Sep. 15, 2015.

(51) Int. Cl.
*H04M 1/05* (2006.01)
*G06F 1/16* (2006.01)

(52) U.S. Cl.
CPC .............. *H04M 1/05* (2013.01); *G06F 1/166* (2013.01)

(58) Field of Classification Search
CPC ..................................................... H04M 1/05
See application file for complete search history.

(56) References Cited

U.S. PATENT DOCUMENTS

| 3,163,722 | A | 12/1964 | Gomez |
| 4,058,689 | A | 11/1977 | Stebinger |
| 4,556,762 | A | 12/1985 | Campbell |
| 4,878,237 | A | 10/1989 | Cianflone |
| 6,246,764 | B1 * | 6/2001 | Owen ..................... H04M 1/05 379/449 |
| 6,535,606 | B2 | 3/2003 | Cox |
| 7,003,105 | B2 * | 2/2006 | Gledhill .................. H04M 1/05 379/449 |

OTHER PUBLICATIONS

Shoulder Rest for Cell Phone. Product Listing [online]. Goddess Products, Inc., 2015 [retrieved on Jul. 29, 2015]. Retrieved from the Internet: http://www.goddessproductsinc.com/Products/Shoulder-Rest-for-Cell-Phone-White_SOF00908M.aspx.

* cited by examiner

*Primary Examiner* — Tuan H Nguyen
(74) *Attorney, Agent, or Firm* — Robert C. Montgomery; Montgomery Patent & Design

(57) ABSTRACT

A collapsible shoulder rest for a personal electronic device is incorporated into a protective case. The shoulder rest is secured within the back of the case and fan folds out away from the back. The shoulder rest is perpendicular to the width of the case.

20 Claims, 5 Drawing Sheets

COLLAPSIBLE SHOULDER REST FOR PORTABLE ELECTRONIC DEVICE

RELATED APPLICATIONS

The present invention is a Continuation and claims the benefit of U.S. Provisional Application No. 62/218,604, filed on Sep. 15, 2015, the entire disclosures of which are incorporated herein by reference.

FIELD OF THE INVENTION

The present invention relates generally to the field of mobile phone holding means and more specifically relates to a collapsible shoulder rest for portable electronic equipment.

BACKGROUND OF THE INVENTION

Mobile and smart phone devices comprise a group of electronic equipment which are now considered a necessity in today's technologically driven society. People in all walks of life use these devices for conversing with other device users as well as for a variety of other forms of communication e.g., texts, pictures, e-mail, and accessing the internet. While utilizing such devices, maintaining a suitable hands-free conversation can be a strain on a user's head and neck. This strain is often the result of the user pinching the device between his or her neck and the shoulder in an effort free up one or both hands to manipulate the controls or a writing implement, amongst other numerous activities which require a free hand.

Furthermore, such a contortion of the user's body may cause accidental and undesirable dropping of the device and/or the temporary abandonment of the activity which required the use of a free hand(s). Additionally, propping the device between the neck and shoulder may also impede the ability of an ambulatory user to avoid a collision with other people or structural impediments since the user's vision may become misdirected due to the angle of the user's head. It is therefore also desirable to create a device that may keep a user of such a device's head in a direction which comports with the user's path of travel and line of sight.

Various attempts have been made to solve problems found in mobile phone holder art. Among these are found in: U.S. Pat. And U.S. Pat. App. Pub. No. 6,535,606 to James Cox, 2012/0046083 to Keven H. Klett, and U.S. Pat. No. 5,668, 869 to Raphael Zinno. These prior art references are representative of shoulder rests for mobile phones.

None of the above referenced inventions and patents are collapsible and taken either singly or in combination, is seen to describe the invention as claimed. Thus, a need exists for a reliable and collapsible shoulder rest for a piece of portable electronic equipment to avoid the above-mentioned problems.

SUMMARY OF THE INVENTION

The device comprises a rest for a portable electronic device comprising a case which is configured to be removably secured to a rear face of a portable electronic device, a telescoping upper support frame which is secured subjacent to the top edge exterior face of the case, a main support hinge which is secured superjacent to a bottom edge exterior face of the case, at least one (1) pair of main support frames, each main support frame having a first end which is pivotally attached to the upper support frame and a second end which is pivotally attached to the main support hinge, a secondary support hinge which is affixed between an outermost pair of main support frames and is parallel to the main support hinge while being positioned between the upper support frame and the main support hinge, at least one (1) pair of secondary support frames, each secondary support frame having a first end pivotally attached to the upper support frame and a second end pivotally attached to the secondary support hinge and a flexible cover which is affixed to and spans the area between the upper support frame and the main support hinge. When in a deployed state, the rest comprises a fanned out structure which at least partially protrudes from the rear face of the case. When in a collapsed state, the rest folds flat against the rear face of the case. In an alternate embodiment the rest may comprise part of the physical case of the portable electronic device. Both embodiments may also be specifically limited to having five pairs of main support frames.

The secondary support hinge may be capable of longitudinal traverse relative to the outermost pair of main support frames. A portion of the cover which is coincidental with an area spanned by the secondary support hinge, both secondary support frames, and a common centerline which bisects the upper support frame comprises a slip resistant material. The main and secondary support frames may comprise a lightweight plastic.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
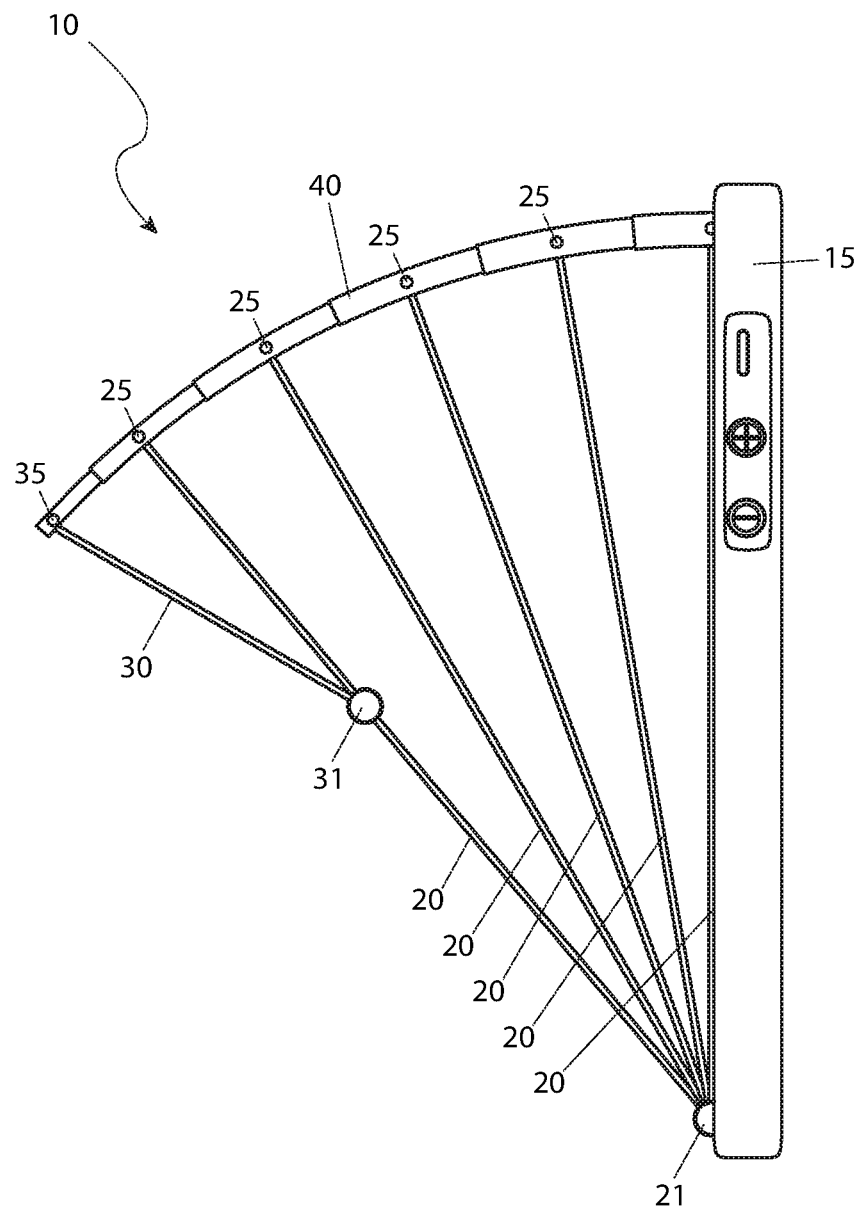
FIG. 1 is a side elevation view of a mobile phone shoulder rest 10, during a "deployed" condition, where the cover 50 is removed in order to illustrate the upper support frame 40, the main support frame 20, and the secondary support frame 30 fully expanded out from a back of a mobile phone case 15, according to an embodiment of the present invention.

DESCRIPTIVE KEY 10 mobile telephone shoulder rest
15 case
20 main support frame
21 main support hinge
25 main support pivot
30 secondary support frame
31 secondary support hinge
35 secondary support pivot
40 upper support frame
50 cover
55 slip resistant material
100 mobile phone 105 user
110 ear
115 shoulder
120 cumbersome task
125 hands
130 offset angle "a"
135 user's body axis
140 user's head axis
145 frame arrangement
150 offset angle "b"

DETAILED DESCRIPTION OF THE PREFERRED EMBODIMENT

The present invention is directed to a mobile phone shoulder rest (herein described as the "rest") 10. In one (1) embodiment of the present invention, the rest 10 may comprise a framework 20, 30, 40 made of a lightweight plastic that allows for easy storage in the back of the mobile phone case 15 when not in use.

Referring now to the drawings, there is shown in FIG. 1 a rest 10 during a "deployed" condition. An accordion style fanned out plastic structure 20, 30, 40, 50, 55 protrudes from the rear of the mobile phone case 15, as shown. A telescoping upper support frame 40 extends outward from the case 15. A plurality of main support frame pairs 20 each has a first end pivotally attached the upper support frame 40 with a main support pivot 25. The second end of each of the main support frames 20 is attached to a main support hinge 20 spanning a distance between each of the pairs of main support frames 20 and attached the bottom of the case 15. Certain embodiments may comprise five (5) pairs of main support frames 20 fastened together. A pair of secondary support frames 30 each has a first end pivotally attached to the upper support frame 20 with a secondary support pivot 35. The second end of each of the secondary support frames 30 are pivotally attached to a secondary support hinge 31 spanning a distance between an outermost pair of main support frames 20 and parallel with the main support hinge 21. In another embodiment, the secondary support hinge 31 may advance longitudinally along the outermost main support frame pair 20. A flexible cover 50 is envisioned to cover the main support frame pairs 20 rear and side portions, as well as the upper support frame 40 and secondary support frame pair 30. An upper portion of the cover 50, coinciding with the area framed by the upper support frame 40 and the secondary support frames 30 is covered with a slip resistant material 55. This may allow the rest 10 to be folded neatly into the back of the case 15 when pressure is applied. Once deployed in the fully open position, an individual can then place the rest 10 on his/her shoulder, which then aligns the mobile phone to the user's ear while the head is in a vertical position. Once the conversation is completed, the rest 10 is simply folded back into the case for future use.

Figure 2:
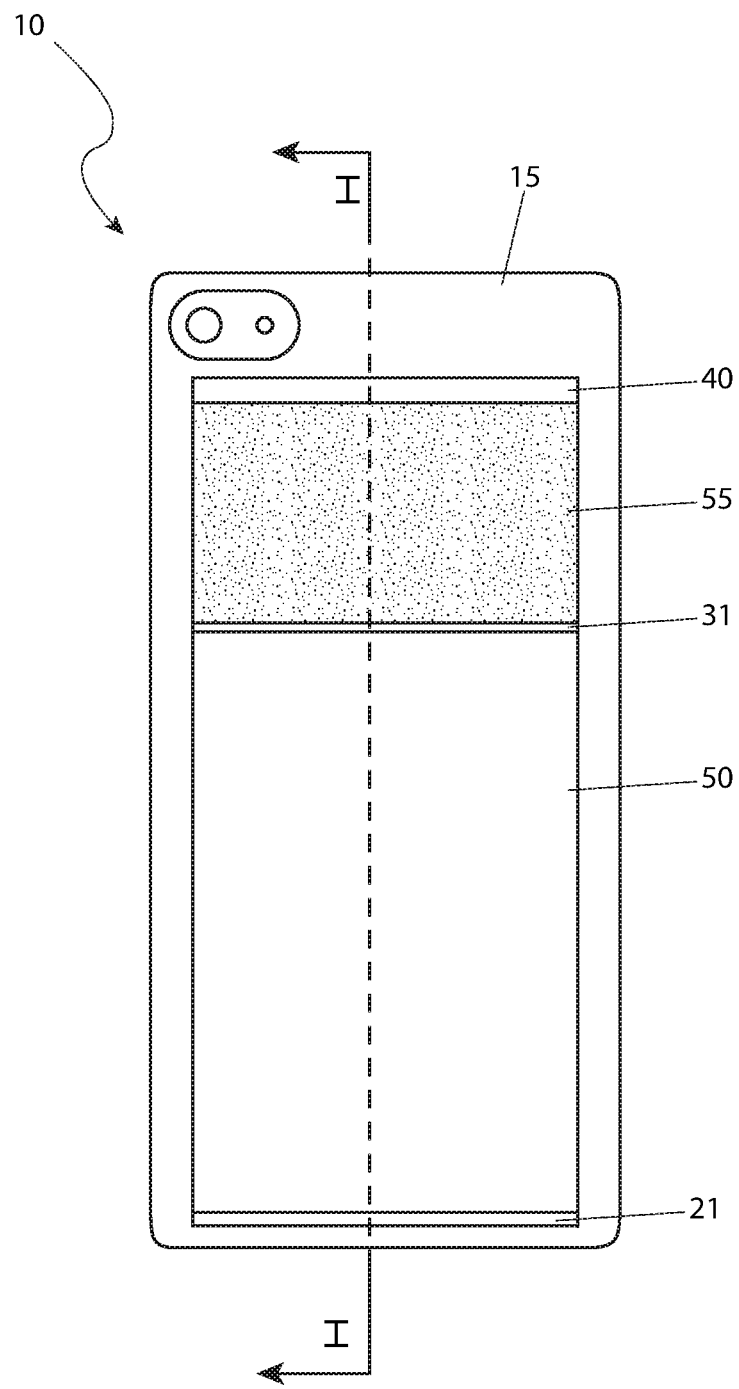
FIG. 2 is a rear elevation view illustrating the mobile phone shoulder rest 10 folded into the back of the mobile phone case 15, according to an embodiment of the present invention.

FIG. 2 shows a back perspective view of the rest 10. Once folded in the closed position, the slip resistant material 55 and double hinge design is easily viewable. This design allows for the rest 10 to be retro-fit to an existing case 15, or bundled together with a case 15 in an alternate embodiment. The stored state illustrates that when the rest 10 is folded and secured into place, there is no significant increase in the width of the mobile phone. This design may be desirable for use with all forms and sizes of mobile phones. Furthermore, the light material used in the design of the rest 10 may not increase the weight of the mobile phone by a significant amount. When deployed, the slip resistant material 55 of the cover 50 may sit on a user's shoulder to prevent the mobile phone from sliding while in use. These features provide convenience for the user. The exact specifications, materials used, and method of use of the rest 10 may vary upon manufacturing.

Figure 3:
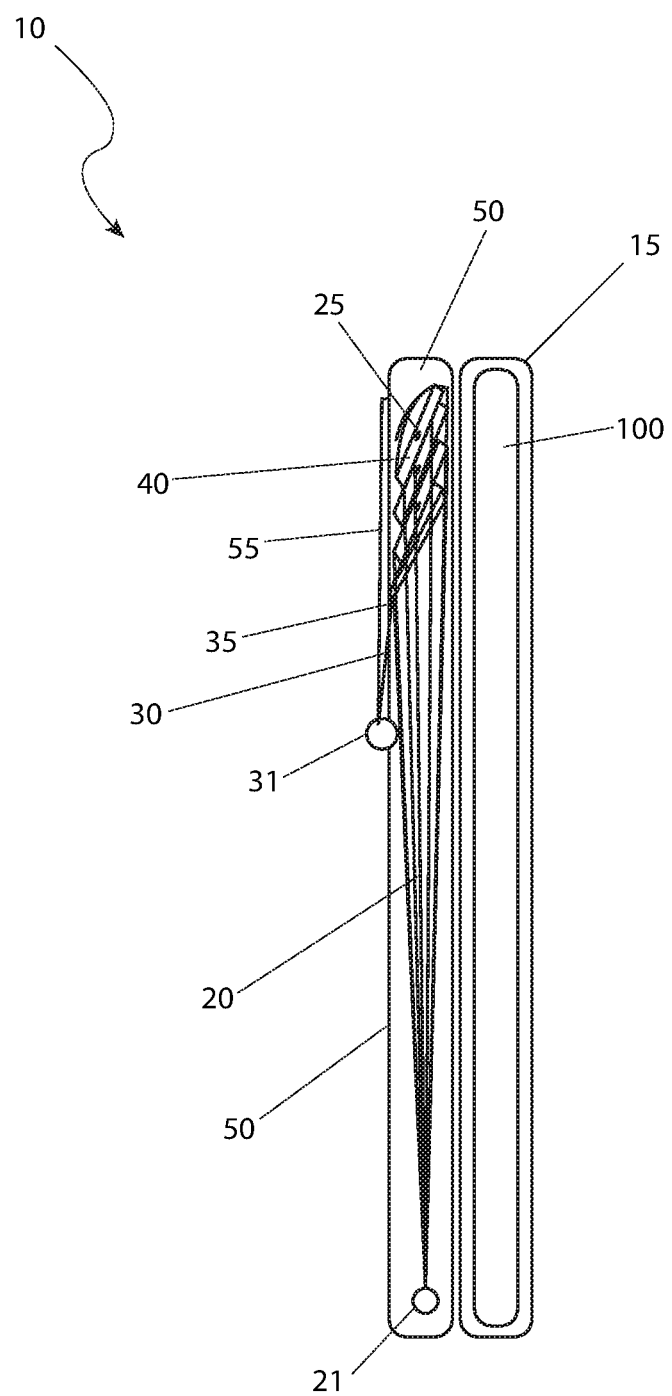
FIG. 3 is a sectional view of the mobile phone shoulder rest 10, as seen along a line I-I taken in FIG. 2, according to an embodiment of the present invention.

Referring now to FIG. 3, a sectional view of the rest 10, as seen along a line I-I, as seen in FIG. 2, according to an embodiment of the present invention is depicted. This figure clearly depicts a mobile phone 100 held inside the case 15 where it is held by friction fit. The cover 50 encloses the movable components of the mobile telephone shoulder rest 10. The upper support frame is now in a capsized or retracted state with each individual main support pivot resting on each other. The main support frame 20 remains connected to the secondary support hinge 31 at the lower end and the main support pivot 25 at its opposite or distal end. The secondary support frame 30 remains connected to the secondary support hinge 31 at its lower end and the secondary support pivot 35 at the opposite or distal end. The secondary support frame 30 provides a structural base for the slip resistant material 55 provided as part of the cover 50. It should be noted that the overall thickness of the mobile telephone shoulder rest 10 presents only a minimum amount of increase over the bare mobile telephone 100 and is not envisioned to be a burden when stored in a pocket, purse, or other location.

Figure 4:
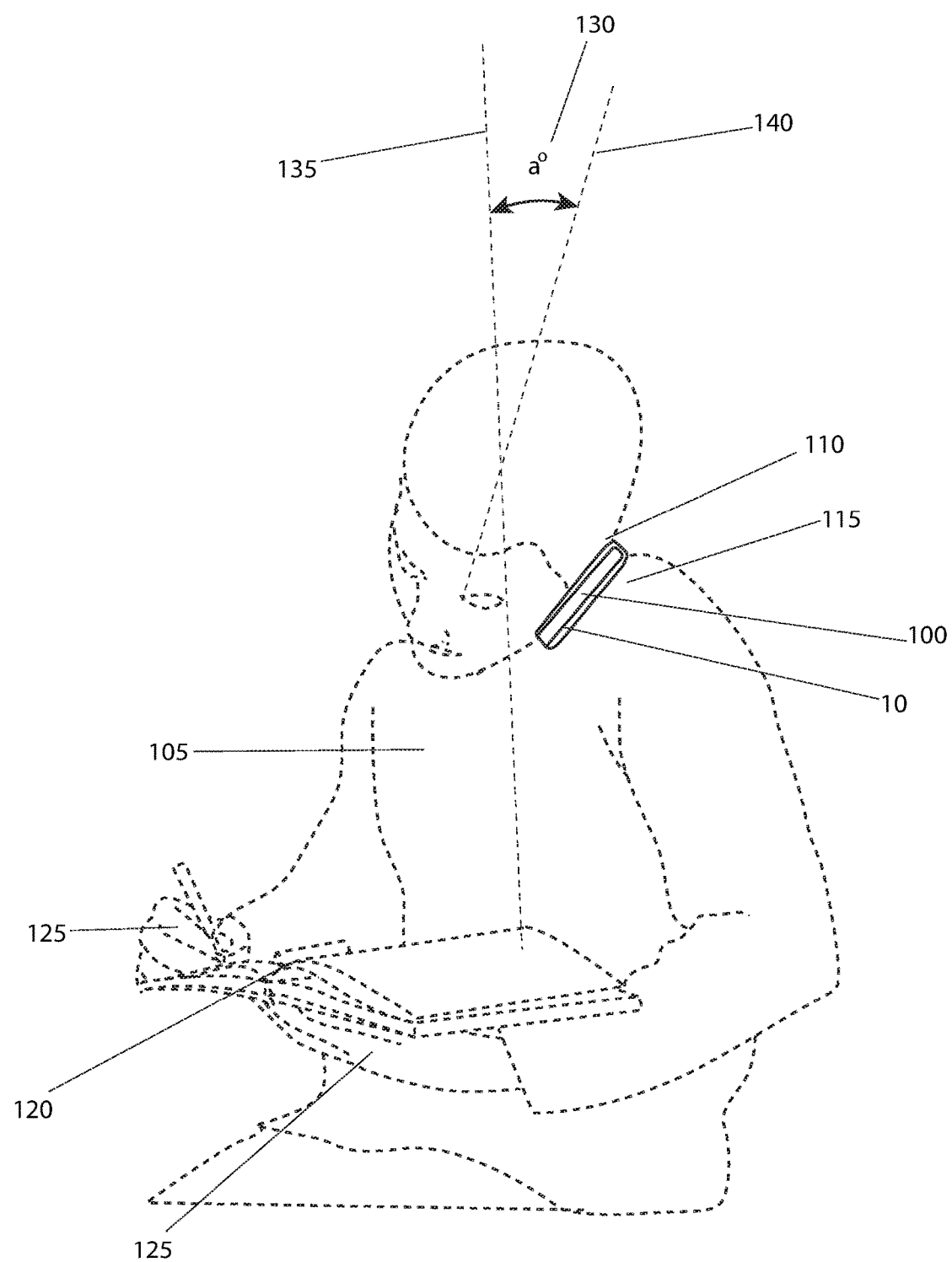
FIG. 4 is a pictorial view of the mobile phone shoulder rest 10, shown in a utilized but retracted state, according to an embodiment of the present invention; and, FIG. 5 is a pictorial view of the mobile phone shoulder rest 10, shown in a utilized and deployed state, according to an embodiment of the present invention.

Referring next to FIG. 4, a pictorial view of the rest 10, shown in a utilized but retracted state, according to an embodiment of the present invention is disclosed. A user 105 holds the mobile phone 100, encased within the mobile telephone shoulder rest 10 between their ear 110 and their shoulder 115. This arrangement is similar to that which would be experienced when using only a mobile phone 100 without the present invention. The user 105 is occupied with a cumbersome task 120, requiring the use of both hands 125. Such an arrangement produces an offset angle "a" 130 between the user's body axis 135 and the user's head axis 140. While such an offset angle "a" 130 may be acceptable for a short period of time such as to write down an address or telephone number, long term positioning is viewed as likely to create sore neck muscles or even debilitating injury.

Figure 5:
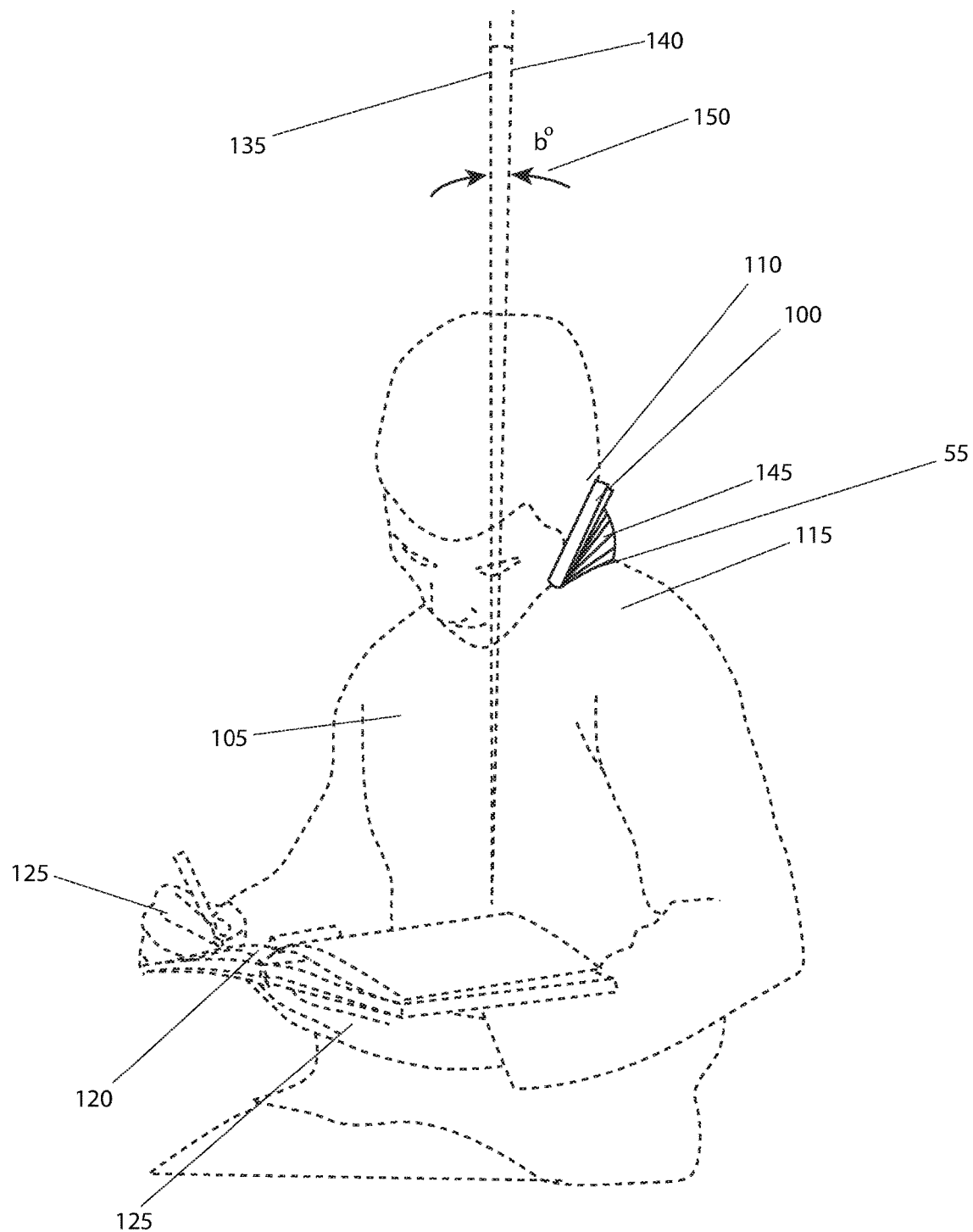

Referring finally to FIG. 5, a pictorial view of the rest 10, shown in a utilized and deployed state, according to an embodiment of the present invention is shown. In this FIG, the user 105 has deployed the frame arrangement 145 consisting of the main support frame 20, the main support hinge 21, the main support pivot 25, the secondary support frame 30, the secondary support hinge 31, the secondary support pivot 35, and the upper support frame 40 (all of which are depicted in FIG. 1). The user 105 is still provided with placement of the mobile phone 100 between their ear 100 and their shoulder 115. The slip resistant material 55 ensures that the mobile phone 100 remains in place while only held by friction fit. Once again the user 105 is occupied with a cumbersome task 120, requiring the use of both hands 125. Such an arrangement produces an offset angle "b" 150 between the user's body axis 135 and the user's head axis 140. It should be noted that the offset angle "b" 150 is much less that the offset angle "a" 130 (as shown in FIG. 4). Such a reduced angle is viewed as much less stressful over longer periods of time, thus allowing the user 105 to conduct entire telephone conservations, even lasting hours long, while performing cumbersome tasks 120, without short term pain or long term afflictions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A rest for a portable electronic device, comprising:
   a case, configured to removably secure to a rear face of said portable electronic device;
   a telescoping upper support frame secured subjacent to a top edge exterior face of said case;
   a main support hinge secured superjacent to a bottom edge exterior face of said case;
   at least one pair of main support frames, each having a first end pivotally attached to said upper support frame and a second end pivotally attached to said main support hinge;
   a secondary support hinge affixed between an outermost pair of main support frames, parallel to said main support hinge and positioned between said upper support frame and said main support hinge;
   at least one pair of secondary support frames, each having a first end pivotally attached to said upper support frame and a second end pivotally attached to said secondary support hinge; and,
   a flexible cover affixed to and spanning an area between said upper support frame and said main support hinge;
   wherein when in a deployed state, said rest comprises a fanned out structure at least partially protruding from said rear face of said case; and,
   wherein when in a collapsed state, said rest folds flat against said rear face of said case.

2. The rest of claim 1, wherein said secondary support hinge is capable of longitudinal traverse relative to said outermost pair of main support frames.

3. The rest of claim 1, wherein a portion of said cover coincidental with an area spanned by said secondary support hinge, each pair of secondary support frames, and a common centerline bisecting said upper support frame is a slip resistant material.

4. The rest of claim 3, wherein each pair of main support frames comprises a lightweight plastic.

5. The rest of claim 3, wherein each pair of secondary support frames comprises a lightweight plastic.

6. A portable electronic device, comprising:
   a telescoping upper support frame secured subjacent to a top edge exterior face of said portable electronic device;
   a main support hinge secured superjacent to a bottom edge exterior face of said portable electronic device;
   at least one pair of main support frames, each having a first end pivotally attached to said upper support frame and a second end pivotally attached to said main support hinge;
   a secondary support hinge affixed between an outermost pair of main support frames, parallel to said main support hinge and positioned between said upper support frame and said main support hinge;
   at least one pair of secondary support frames, each having a first end pivotally attached to said upper support frame and a second end pivotally attached to said secondary support hinge; and,
   a flexible cover affixed to and spanning an area between said upper support frame and said main support hinge;
   wherein when in a deployed state, said device comprises a fanned out structure at least partially protruding from said rear face of said portable electronic device; and,
   wherein when in a collapsed state, said device folds flat against said rear face of said portable electronic device.

7. The device of claim 6, wherein said secondary support hinge is capable of longitudinal traverse relative to said outermost pair of main support frames.

8. The device of claim 6, wherein a portion of said cover coincidental with an area spanned by said secondary support hinge, each pair of secondary support frames, and a common centerline bisecting said upper support frame is a slip resistant material.

9. The device of claim 8, wherein each pair of main support frames comprises a lightweight plastic.

10. The device of claim 8, wherein each pair of secondary support frames comprises a lightweight plastic.

11. A rest for a portable electronic device, comprising:
    a case, configured to removably secure to a rear face of said portable electronic device;
    a telescoping upper support frame secured subjacent to a top edge exterior face of said case;
    a main support hinge secured superjacent a bottom edge exterior face of said case;
    five pairs of main support frames, each having a first end pivotally attached to said upper support frame and a second end pivotally attached to said main support hinge;
    a secondary support hinge affixed between an outermost pair of main support frames, parallel to said main support hinge and positioned between said upper support frame and said main support hinge;
    at least one pair of secondary support frames, each having a first end pivotally attached to said upper support frame and a second end pivotally attached to said secondary support hinge; and,
    a flexible cover affixed to and spanning an area between said upper support frame and said main support hinge;
    wherein when in a deployed state, said rest comprises a fanned out structure at least partially protruding from a rear face of said case; and,
    wherein when in a collapsed state, said rest folds flat against said rear face of said case.

12. The rest of claim 11, wherein said secondary support hinge is capable of longitudinal traverse relative to said outermost pair of main support frames.

13. The rest of claim 11, wherein a portion of said cover coincidental with an area spanned by said secondary support hinge, each pair of secondary support frames, and a common centerline bisecting said upper support frame is a slip resistant material.

14. The rest of claim 13, wherein each pair of main support frames comprises a lightweight plastic.

15. The rest of claim 13, wherein each pair of secondary support frames comprises a lightweight plastic.

16. A portable electronic device, comprising:
    a telescoping upper support frame secured subjacent to a top edge exterior face of said portable electronic device;
    a main support hinge secured superjacent to a bottom edge exterior face of said portable electronic device;
    five pairs of main support frames, each having a first end pivotally attached to said upper support frame and a second end pivotally attached to said main support hinge;
    a secondary support hinge affixed between an outermost pair of main support frames, parallel to said main support hinge and positioned between said upper support frame and said main support hinge;

at least one pair of secondary support frames, each having a first end pivotally attached to said upper support frame and a second end pivotally attached to said secondary support hinge; and, a flexible cover affixed to and spanning an area between said upper support frame and said main support hinge;

wherein when in a deployed state, said device comprises a fanned out structure at least partially protruding from the rear face of said portable electronic device; and, wherein when in a collapsed state, said device folds flat against said rear face of said portable electronic device.

17. The device of claim 16, wherein said secondary support hinge is capable of longitudinal traverse relative to said outermost pair of main support frames.

18. The device of claim 16, wherein a portion of said cover coincidental with an area spanned by said secondary support hinge, each pair of secondary support frames, and a common centerline bisecting said upper support frame is a slip resistant material.

19. The device of claim 18, wherein each pair of main support frames comprises a lightweight plastic.

20. The device of claim 18, wherein each pair of secondary support frames comprises a lightweight plastic.

* * * * *